(12) United States Patent
Ostrowski

(10) Patent No.: US 6,388,411 B1
(45) Date of Patent: May 14, 2002

(54) WIPER CONTROL ARRANGEMENT

(75) Inventor: Wolfgang Ostrowski, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/522,645

(22) Filed: Mar. 10, 2000

Related U.S. Application Data

(63) Continuation of application No. PCT/EP98/04748, filed on Jul. 29, 1998.

(51) Int. Cl.$^7$ ................................................. H02P 7/00
(52) U.S. Cl. ................... 318/461; 318/443; 318/DIG. 2
(58) Field of Search .................. 318/DIG. 2, 280, 318/286, 443, 445, 461

(56) References Cited

U.S. PATENT DOCUMENTS

| | | | |
|---|---|---|---|
| 3,675,103 A | 7/1972 | Elliott | 318/281 |
| 4,329,631 A | 5/1982 | Betsch et al. | 318/466 |
| 4,866,357 A * | 9/1989 | Miller et al. | 318/DIG. 2 |
| 4,934,014 A | 6/1990 | Yamamoto | 15/250.13 |
| 5,287,585 A | 2/1994 | Yamamoto et al. | 15/250.13 |
| 5,333,351 A * | 8/1994 | Sato | 15/250.13 |
| 5,506,483 A | 4/1996 | McCann et al. | 318/444 |
| 5,929,588 A * | 7/1999 | Shiah | 318/653 |

FOREIGN PATENT DOCUMENTS

| | | |
|---|---|---|
| DE | 3208121 | 9/1983 |
| DE | 3415614 | 11/1984 |
| DE | 19634559 | 9/1998 |

OTHER PUBLICATIONS

Abstract of Japan JP 04 353 057 dated Dec. 8, 1992.

* cited by examiner

Primary Examiner—Robert E. Nappi
Assistant Examiner—Rina I. Duda
(74) Attorney, Agent, or Firm—Baker Botts LLP

(57) ABSTRACT

A wiper control arrangement for vehicles has a motor with a reversible direction of rotation and a driven shaft to which a wiper is rigidly coupled, and a position regulator which receives a wiper drive control signal and a driven shaft position signal detected by a detector of the position of the driven shaft and supplies a regulating variable to the motor. The signal from a vehicle speed sensor and/or wiping angular speed sensor associated with the wiper control arrangement are supplied to the position regulator, the wiper drive control and/or the driven shaft position detector in order to reduce the wiping angle of the wiper at higher speeds of the vehicle and/or higher wiping angular speeds.

9 Claims, 1 Drawing Sheet

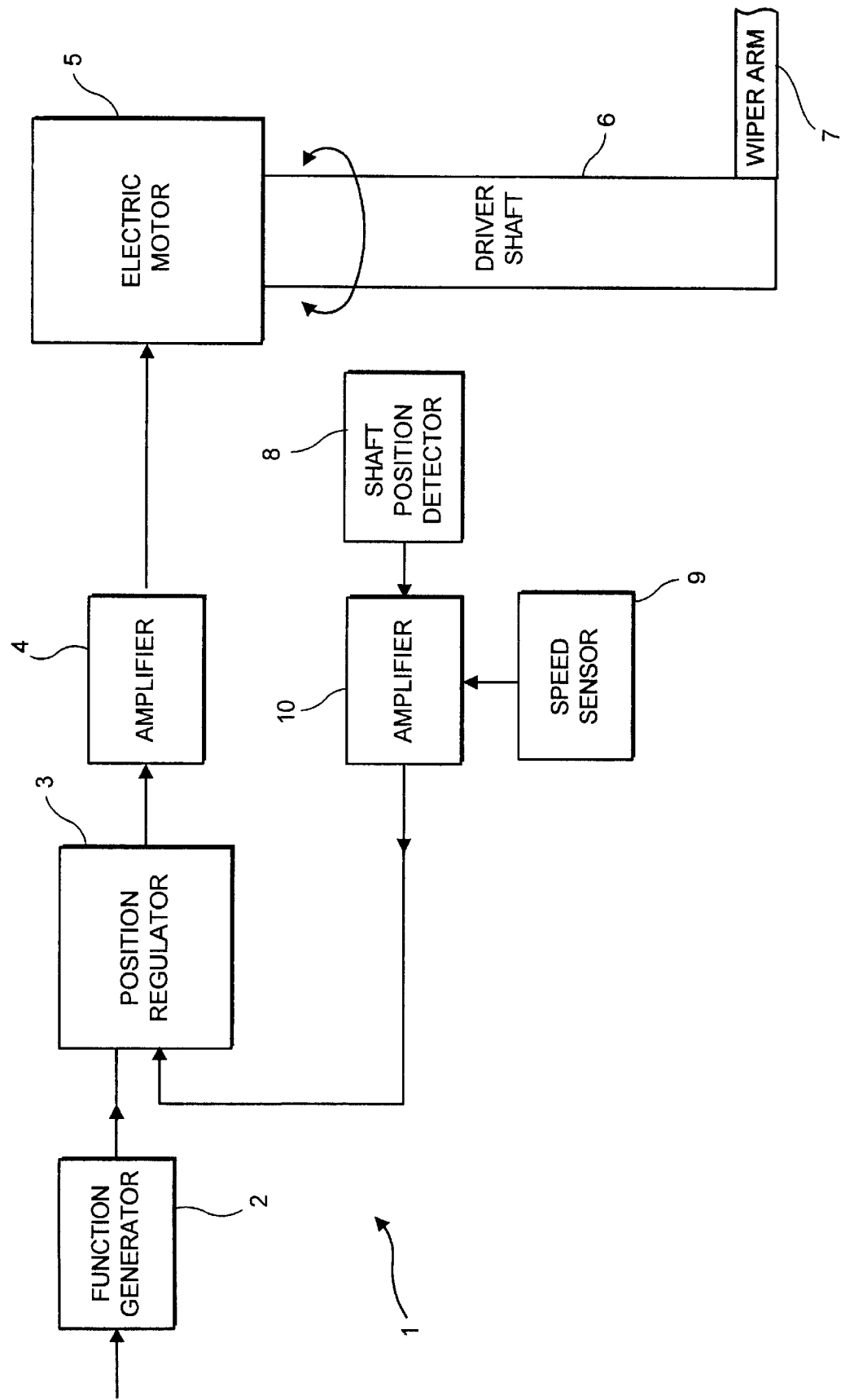

WIPER CONTROL ARRANGEMENT

REFERENCE TO RELATED APPLICATION

This application is a continuation of International Application No. PCT/EP98/04748 filed Jul. 29, 1998.

BACKGROUND OF THE INVENTION

This invention relates to wiper control arrangements, in particular for motor vehicles, in which the position of wiper is detected and controlled.

German Offenlegungsschrift No. 32 08 121 discloses a wiper control arrangement having an electric motor with a reversible direction of rotation with a driven shaft to which at least one wiper arm is rigidly connected. The motor has a motor control circuit and a position regulator that produces a variable regulating signal for a motor switching circuit in which, on the one hand, the rotational position of the driven shaft of the motor is the controlled variable and, on the other hand, a specifiable path of the wiper motion is supplied as a time-dependent command variable to the position regulator. For determination of the controlled variable, a shaft-position indicator, rigidly coupled to the driven shaft of the motor, produces a signal representing the actual position of the driven shaft as an electrical variable, the shaft-position indicator constituting, for example, a potentiometer. A function generator supplying an output signal to the set value input of the position regulator generates the command variable. A periodic output signal having a voltage curve which is a function of time is produced at the output of the function generator. To produce variable wiping speeds, the function generator is controlled by an adjustable clock frequency which is obtained from a voltage-controlled oscillator. To vary the wiping angle, the voltage produced by the rotating generator must vary correspondingly. This is effected by an increase or decrease of the level of a direct voltage source supplied to the potentiometer so that the corresponding instantaneous value for the function generator is reached earlier or later, which results in reduction or increase of the wiping angle.

In wiper control arrangements, the problem arises that considerable wind forces act on the wiper arm or arms when, for example, a motor vehicle travels at high speed. As a result, the wiper arm, because of the applied wind forces, may move beyond its normal reversal point and only be able to reverse direction at a location beyond that point. As a result, the wiper blade fastened to the wiper arm may strike the window posts of the vehicle and cause corresponding damage. An additional risk is that the wiper arm may swing beyond the window posts and then operate abnormally.

To solve this problem, U.S. Pat. No. 5,287,585 discloses a wiper control arrangement that includes the following components: a rotatably supported main shaft to which a wiper arm is connected, a cam element fastened to the main shaft, a plate rotatably supported on a main lever by a first pin, a lower lever having one end that is arranged about the cam element and another end that is connected to the plate by a second pin, an arm rotatably supported on the plate by a third pin, the arm having an articulated section connected to a drive mechanism for the wiper, and a torsion spring acting between the plate and the arm to hold the arm in a specified position. In operation, the cam element rotates on an upper reversal point, urging the plate to turn, together with the arm, about the first pin by action of the lower lever. However, since the plate and the arm are connected with the wiper drive mechanism by the articulated section, the main lever turns. In other words, the position of the wiper arm at the upper reversal point is pushed back, with respect to the normal position, by a distance that corresponds to the angle of rotation of the main lever. Therefore, even when the wiper arm is moved by wind forces when the vehicle is moving at high speed, the motion of the wiper arm because of these wind forces is offset by the described arrangement so that the wiper arm reverses at its normal upper reversal point. Thus, the wiper arm can be prevented from striking the window posts without affecting the driver's field of vision. The disadvantage of this wiper arrangement is its extremely complex mechanical design which leads to manufacturing difficulties and susceptibility to failure.

U.S. Pat. No. 4,934,014 discloses a wiper arrangement in which the wiping angle of the blade is reduced at high vehicle speeds to solve the problem. In this case, the wiper arrangement has a fixed structural part that is fastened to the vehicle body, a rotatably supported shaft, an arm connected to one end of the shaft carrying a wiper blade, a pivoting element connected to the other end of the shaft, a drive mechanism providing an angular oscillating motion of the pivoting element, an adjusting device for adjusting the connecting point between the pivoting element and the drive mechanism, and a control unit for driving the adjusting device as a function of vehicle speed and the angular speed of the pivoting element. The drive mechanism includes a first pin that is driven by a first motor around a circular path and which is functionally connected to a second pin which is moved by a bar connected to the pivoting element. Since the bar is displaced in a reciprocating motion by operation of the motor, the pivoting element is displaced by a pivoting motion about the axis of rotation of the shaft, which is rigidly connected to the pivoting element. The shaft is rotatably supported in the fixed structural part and an additional pin is moved by the pivoting element while an additional bar extends between that pin and a ball joint that is part of the adjusting device. The pivoting motion of the pivoting element displaces the bar in a reciprocating motion so that the pivoting element fastened to the shaft is also pivoted.

The adjusting device includes an additional motor with an additional rotatable shaft which is mounted on the pivoting element that is connected with the shaft drive mechanism and a worm wheel that is fixedly connected to the shaft of the adjusting device. The worm wheel meshes with another worm wheel fixedly mounted at one end of an additional shaft and an additional worm wheel that meshes with a toothed wheel is mounted at the other end of the additional shaft. The toothed wheel, the ball joint and a sensor with first and second sections are rotatably mounted on an additional common pin that is firmly connected to the pivoting element of the drive mechanism. The ball joint has an eccentric attachment by which the ball joint, upon rotation of the toothed wheel, can be turned on the pin together with the toothed wheel and the first section of the sensor.

Rotation of the ball joint by the pin causes the position of the connection point at which the bar is connected to the pivoting element to be varied. This variation results in a variation of the spacing between the connection point and the shaft. The variation of the angle of pivot of the pivoting element corresponding to this variation in spacing controls the angle of motion of the wiper blades which are rigidly connected to the pivoting element. This wiper control arrangement is disadvantageous because of its complex mechanical design, as well as the large number of components required including two motors.

SUMMARY OF THE INVENTION

Accordingly, it is an object of the invention to provide a wiper control arrangement which overcomes disadvantages of the prior art.

Another object of the invention is to provide a wiper control arrangement which is simple in design and in which striking of a wiper arm on a window post because of the wind forces generated by the speed of travel is prevented.

These and other objects of the invention are attained by providing a wiper control arrangement in which operation of a wiper is controlled in response to a vehicle speed or wiper speed or position sensor. By providing a speed sensor for sensing vehicle wiper speed and generating a control signal which controls a wiper position regulator and/or the wiper operation angle and/or providing a detector for determining the position of the wiper device shaft in such a way that the adjusted wiping angle of the wiper is reduced at high vehicle speeds and/or high angular wiping speeds, no mechanical changes of any kind in the wiper control arrangement are necessary. Since the speed of a vehicle is determined in any event, the detected vehicle speed signal may be used so that essentially the only additional equipment requirement for application of the invention is wiring. Since the angular wiping speed is set by the wiper itself, that value is likewise known without requiring additional sensory analysis, so that equipment for detection of the angular wiping speed is already inherently present in the wiper arrangement.

In a preferred embodiment of the invention, the detector for determining the wiper position is a Hall generator, i.e., a device which produces a signal which varies as a function of the wiping angle based on the normal component of a magnetic field which varies with wiper position and which is detectable as Hall voltage variation as an input to a semiconductor chip. The advantage of such non-contacting position detection is that there is no wear of any kind, such as occurs in the sliding contacts of a potentiometer.

BRIEF DESCRIPTION OF THE DRAWING

Further objects and advantages of the invention will be apparent from a reading of the following description in conjunction with the accompanying the single drawing FIGURE which a schematic block diagram illustrating a representative embodiment of a wipe control arrangement in accordance with the invention.

DESCRIPTION OF PREFERRED EMBODIMENTS

In the typical embodiment of the invention shown in the drawing, a wiper control arrangement 1 includes a function generator 2, a position regulator 3, an amplifier 4, an electric motor 5, which may be a direct current motor, having a driven shaft 6, to which a wiper arm 7 of a wiper (not separately illustrated) is coupled, a detector 8 for determining the position of the driven shaft 6, a speed sensor 9, and an amplifier 10.

The function generator 2 supplies a wiper drive control signal to the position regulator 3, for example in the form of a sinusoidal voltage having a period T. The position regulator 3, which may be a difference amplifier, generates a difference variable having a plus or a minus sign indicating the direction of the difference between the wiper drive control signal and the actual position of the shaft 6 as detected by the detector 8. If it is assumed that the output signal of the detector 8 is zero at the start, tile position regulator 3, with the increasing value of the sinusoidal control signal, produces a positive difference signal which is amplified with the correct sign by the amplifier 4 and supplied to the electric motor 5 as a control variable, the direction of rotation of the electric motor 5 and its driven shaft 6 being dependent upon the plus or minus sign of the control variable.

The positive control variable causes the motor to rotate the shaft 6 in a specific direction, and the wiper arm 7 is correspondingly driven. The rotation of the shaft 6 is detected by the detector 8 which preferably is designed in such a way that it converts a change in position directly into an electrical signal. For this purpose, it may, for example, be a potentiometer that is connected with the driven shaft 6 in such a way that a change in position varies the resistance value so that, at constant current, the increased or decreased voltage through the potentiometer is a measure of the position of the shaft 6.

Alternatively, the detector 8 may be a Hall generator which makes use of the fact that a normal component of a magnetic field produces a transverse voltage in a current-carrying semiconductor element which is proportional to the magnitude of the normal component. A permanent magnet mounted on the shaft 6 varies its position with respect to the fixed semiconductor chip upon rotation of the shaft 6, so that the active normal component, and hence the Hall voltage, also varies. In principle, the magnet or the device producing the magnetic field may alternatively be mounted in a fixed position and the semiconductor chip may be connected to the shaft 6. The output signal from the detector 8 increases and follows the wiper drive control signal until the maximum of the wiper drive control signal is reached at T/4. As the drive signal decreases, the output signal of the shaft rotation detector 8 increases and the plus or minus sign at the output of the position regulator 3 changes, which also results in a change in the direction of rotation of the driven shaft 6 and hence of the wiper arm 7. In order to vary the wiping angle, the output voltage of the detector 8 may be amplified, which results in a reduction of the wiper angle since a smaller rotation of the shaft 6 will then produce the maximum compensation voltage for the drive signal. The amplitude of the drive signal may also be varied. The speed of the wiping operation may be varied by varying of the frequency of the wiper drive control signal.

For compensation of the wind forces occurring at high vehicle speeds, the vehicle speed is detected by a speed sensor 9 and supplied to the amplifier 10 as a control variable. As previously mentioned, control of the function generator 2 is also possible. The speed-dependent output voltage of the speed sensor 9 increases the amplification of the amplifier 10 at higher vehicle speeds so that the wiping angle of the wiper is reduced and the risk of striking the window posts is thereby avoided. Since the wiper arm 7 and the driven shaft 6 are rigidly connected, any deflection of the viper arm 7 caused by wind forces has an effect on the position of the shaft 6 which is detected by the detector 8 so that the reduction in the wiping angle may be precisely selected so that the effective wiping angle provides an optimum field of vision.

If the angular wiping speed must be increased, for example because the intensity of rain has increased, the frequency of the wiper drive control signal is increased by the frequency generator 2, which may be effected either continuously or alternatively stepwise. Since the variation in frequency is controlled spontaneously by the frequency generator 2, the angular wiping speed reduction advantageously is also undertaken directly by the frequency generator. As already stated, the amplitude of the wiper drive control signal may be reduced for this purpose. In this way, the reduction of the wiping angle at higher angular wiping speeds is carried out as a purely internal operation of the frequency generator so that no additional sensors or measuring wires are required. In any case, the wiping angle reduction may in principle be effected at any point at which the wiping angle can be influenced. As is evident, the two reasons for a reduction in wiping angle may occur either separately or simultaneously.

Although the invention has been described herein with reference to specific embodiments, many modifications and variations therein will readily occur to those skilled in the art. Accordingly, all such variations and modifications are included within the intended scope of the invention.

I claim:

1. A wiper control arrangement for vehicles comprising:
   a single drive motor with a reversible direction of rotation;
   a driven shaft to which a wiper is rigidly coupled;
   a detector for detecting the position of the driven shaft;
   a wiper position regulator which receives a wiper drive control signal and an actual driven shaft position signal and supplies a regulating control signal to the drive motor for controlling the wiping speed and wiping angle of the wiper; and
   a sensor for detecting at least one of vehicle speed and angular wiping speed and supplying a signal to the position regulator for modifying the regulation control signal so that the wiping angle of the wiper is reduced at at least one of a higher speed of the vehicle and a higher angular wiping speed.

2. A wiper control arrangement according to claim 1 wherein the wiping angle is adjusted continuously or stepwise in accordance with at least one of the detected vehicle speed and the detected angular wiping speed.

3. A wiper control arrangement according to claim 1 wherein the detector for detecting the driven shaft position is a potentiometer.

4. A wiper control arrangement according to claim 1 wherein the detector for detecting the driven shaft position is a Hall generator.

5. A wiper control arrangement according to claim 1 including a function generator for generating a wiper drive control signal.

6. A wiper control arrangement according to claim 1 wherein the motor is an electric motor.

7. A wiper control arrangement according to claim 6 wherein the motor is a direct current motor.

8. A wiper arrangement according to claim 1 wherein the wiper position regulator is a difference amplifier.

9. A wiper arrangement according to claim 5 wherein the function generator produces a variable frequency output signal.

* * * * *